United States Patent
Racuya-Robbins

(10) Patent No.: US 11,100,383 B2
(45) Date of Patent: Aug. 24, 2021

(54) LIVING MACHINE FOR THE MANUFACTURE OF LIVING KNOWLEDGE

(71) Applicant: Ann Racuya-Robbins, Chevy Chase, MD (US)

(72) Inventor: Ann Racuya-Robbins, Chevy Chase, MD (US)

(*) Notice: Subject to any disclaimer, the term of this patent is extended or adjusted under 35 U.S.C. 154(b) by 0 days.

(21) Appl. No.: 15/091,491

(22) Filed: Apr. 5, 2016

(65) Prior Publication Data

US 2017/0286836 A1 Oct. 5, 2017
US 2019/0279099 A9 Sep. 12, 2019

Related U.S. Application Data

(63) Continuation-in-part of application No. 13/680,062, filed on Nov. 18, 2012, now abandoned, which is a continuation-in-part of application No. 12/599,346, filed on Nov. 9, 2009, now Pat. No. 8,359,275.

(51) Int. Cl.
| | |
|---|---|
| *G06N 3/06* | (2006.01) |
| *G06Q 10/10* | (2012.01) |
| *G06N 3/00* | (2006.01) |
| *G06N 5/02* | (2006.01) |

(52) U.S. Cl.
CPC .............. *G06N 3/004* (2013.01); *G06N 3/061* (2013.01); *G06N 5/022* (2013.01); *G06Q 10/10* (2013.01)

(58) Field of Classification Search
CPC ................................ G06N 5/022; G06N 3/061
See application file for complete search history.

(56) References Cited

U.S. PATENT DOCUMENTS

| | | | | |
|---|---|---|---|---|
| 5,719,938 | A * | 2/1998 | Haas ................ | H04L 63/062 380/281 |
| 6,138,119 | A * | 10/2000 | Hall .................. | G06F 21/10 |
| 7,533,034 | B2 * | 5/2009 | Laurin .............. | G06Q 10/063 705/345 |
| 8,359,275 | B2 * | 1/2013 | Racuya-Robbins ... | G06Q 10/10 705/1.1 |
| 9,230,210 | B2 * | 1/2016 | Shimizu ............ | G06N 5/02 |
| 2001/0032189 | A1 * | 10/2001 | Powell .............. | G06Q 10/10 705/59 |
| 2002/0002524 | A1 * | 1/2002 | Kossovsky ........ | G06Q 10/10 705/36 R |
| 2002/0095302 | A1 * | 7/2002 | Moriwaki ......... | G06Q 10/10 705/1.1 |
| 2004/0006566 | A1 * | 1/2004 | Taylor .............. | G06Q 10/10 |
| 2004/0018474 | A1 * | 1/2004 | D'Ippolito ....... | G09B 19/0076 434/236 |
| 2004/0181417 | A1 * | 9/2004 | Piller ............... | G06Q 10/087 705/300 |
| 2004/0186738 | A1 * | 9/2004 | Reisman .......... | G06Q 10/10 705/26.1 |
| 2004/0205040 | A1 * | 10/2004 | Yoshioka ......... | G06N 5/02 706/50 |

(Continued)

OTHER PUBLICATIONS http://www.livingknowledge.org/, accessed Jul. 9, 2017.*
https://www.worldknowledgebank.com/, accessed Jul. 9, 2017.*
http://humantrustexperience.net/, accessed Jul. 9, 2017.*

*Primary Examiner* — Michael C Zarroli

(57) ABSTRACT

Living Machine for the Manufacture of Living Knowledge by Living Individuals through the practice of the Living Knowledge Creation Process in Living Knowledge Creation Process Cycles where Living Knowledge Economics operates.

1 Claim, 3 Drawing Sheets

(56) References Cited

U.S. PATENT DOCUMENTS

Figure 1:
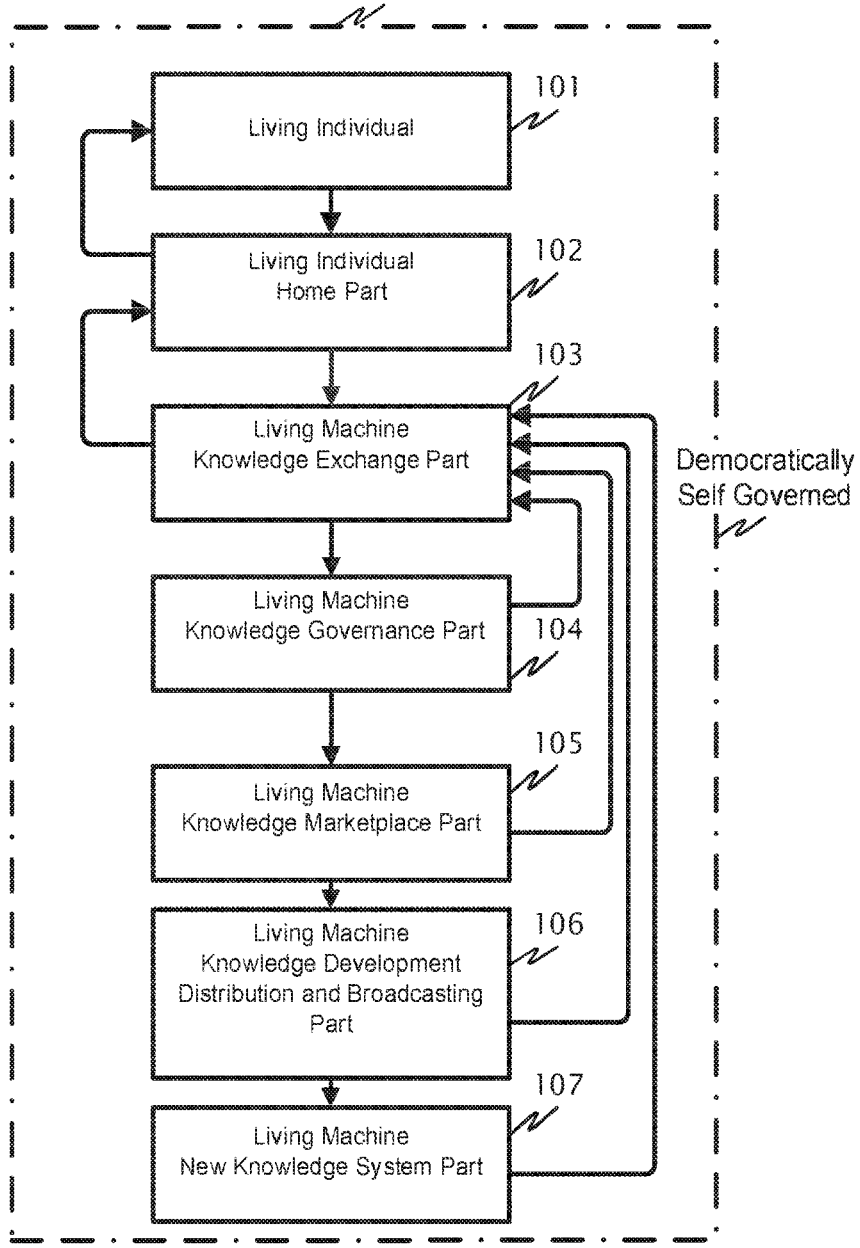

| | | | |
|---|---|---|---|
| 2007/0226163 A1* | 9/2007 | Robles | G06Q 10/00 |
| | | | 706/50 |
| 2008/0147567 A1* | 6/2008 | Perry | G06Q 10/10 |
| | | | 705/36 R |
| 2009/0089238 A1* | 4/2009 | Stevenson-Perez | G06N 5/022 |
| | | | 706/50 |
| 2009/0132815 A1* | 5/2009 | Ginter | G06F 21/33 |
| | | | 713/164 |
| 2011/0137669 A1* | 6/2011 | Bennett | G06F 19/363 |
| | | | 705/2 |
| 2013/0110698 A1* | 5/2013 | Racuya-Robbins | G06Q 90/00 |
| | | | 705/37 |

* cited by examiner

*M* Ann Racuya-Robbins

HOW TO BUILD THE INVENTION

Create Governance
Step 1

Invite People to Participate
Early participation allows people help shaping the governance subsystem.
Step 2

Build the Exchange
Step 3

Build the Marketplace
Step 4

Broadcast to the World
Step 5

Figure 2

LIVING MACHINE FOR THE MANUFACTURE OF LIVING KNOWLEDGE

TECHNICAL FIELD

Life Science

Multidisciplinary field of biology that encompasses the parts of exact, natural, economic and social sciences that are used in the practice and understanding of living organisms' health and well-being including Systems Science, Systems Engineering, Cognitive Science, Neuroscience, Computer and Information Science and Medical Science Class D15 MACHINES NOT ELSEWHERE SPECIFIED Class 705 DATA PROCESSING: FINANCIAL, BUSINESS PRACTICE, MANAGEMENT, OR COST/PRICE DETERMINATION Class 429 CHEMISTRY: ELECTRICAL CURRENT PRODUCING APPARATUS, PRODUCT, AND PROCESS [SUBCLASS 2] 2 HAVING LIVING MATTER, E.G., MICROORGANISM, ETC.:

A portion of the disclosure of this patent document contains material which is subject to (copyright and-or mask work) protection. The (copyright and-or mask work) owner has no objection to the facsimile reproduction by anyone of the patent document or the patent disclosure, as it appears in the Patent and Trademark Office patent file or records, but otherwise reserves all (copyright and-or mask work) rights whatsoever.

15091491 Application and Claim are to be understood in the context of the following:

Living Machine for the Manufacture of Living Knowledge Glossary © 2016-2020 Ann Racuya-Robbins

Glossary

Living

The essential quality and characteristic of living and life experience is the ability to freely bring other things to life, to give life to, to cause life to appear and keep life alive, to survive. Living and life experience use time for and to ensure survival.

Living Knowledge

Sometimes Shortened to Knowledge

Is emergent and additive in living individuals. Knowledge includes information, attributes and data and may be reified in an unlimited number of forms and in the knowledge creation process' new knowledge. This is the power that energizes the living machine including through its New Knowledge System.

Living Individual

A living organism. An embodiment of life that exists in and over time.

Living organisms through the practice of the knowledge creation process, internalize, harness and make useful and meaningful living's ability to bring other things to life in and over time; to cause life to appear from life experience in and over time for the self-same living individual and other living individuals that enhances survival.

Every moment that a living individual is alive that living individual is faced with a complex set of challenges and circumstances that a living individual needs to understand, internalize, and act on. Living individuals are constantly faced with new questions about how to live. A central purpose of the living machine is to empower and increase the capability of the living individuals to survive, to learn about themselves and develop a pool of self-knowledge for their future while taking responsibility for their living knowledge.

Living Knowledge Creation Process (Shortened hereafter to knowledge creation process)

Knowledge creation process causes new living knowledge to come into existence embodied in living individuals.

This living knowledge did not exist before.

This living knowledge appears in a large array of new embodiments including the affective life of living individuals.

The knowledge creation process is not tied to a particular set of skills or technology but when the knowledge creation process is practiced in a living machine it is suitable for creating living knowledge within any technical skill. For this reason, the practice of knowledge creation process is highly adaptable and useful in highly changing environments.

The living knowledge created through the knowledge creation process takes place over time. Each living individual knowledge creation process exists on a time line.

When living individuals share in various ways the knowledge creation process the amount of knowledge brought to life is amplified. Living organisms embody through experience the complex and changeable appearance of the quality of life.

When a living individual realizes the living individual can manufacture living knowledge through the living knowledge creation process that can help that living individual survive that living individual is more encouraged and empowered to find that living individual's own way in life. The recognition of this living capacity creates new opportunities for living individuals and the living machine.

Living Knowledge Creation Process Cycle

Involving one living individual doing a life activity. See FIG. 3.

The knowledge creation process takes place in and over time. While not speculating here on the nature and quality of time involved, the practice of the knowledge creation process can be crystalized into the following steps.

1. A living individual does a living activity in and over time. When the living individual starts the living activity the time line for that living activity begins.
2. A living individual redoes the same activity. The doing and the redoing are never the same.
3. The difference between the doing and the redoing is new living knowledge.
4. When the difference emerges the new knowledge begins a new time line for how to do a living activity.
5. The new living knowledge is preserved in the Living Machine's New Knowledge System Part #107 in FIG. 1, where it becomes available for other living individuals to practice the knowledge creation process. This is one of the primary ways the additive quality of the knowledge creation process provides for an expanding and bountiful supply of new living knowledge in the Living Machine.

Living Knowledge Manufacture

Living individuals create living knowledge naturally and freely. It would be fair to say that creating living knowledge is the essential labor of all life. Most of the living knowledge that is created by living individuals is lost. There are many reasons for this including death, neglect and a living individual being un-and-undervalued. But to a very large extent the reason living knowledge is lost is that until the present invention there existed no conduit no body no machine technology within which living individuals' living knowledge is valued, protected secured and the practice of living knowledge creation process is encouraged governed and enabled to the maximum extent possible at the time. This circumstance is analogous to the situation that existed with electricity.

Electricity while existing naturally, freely and with ubiquity was less useful and meaningful for living individuals until its properties where understood and harnessed through the now and continuing legion of technologies, techniques and devices.

Electricity is in ways and at time invisible. So too the body of the Living Machine is only at times and in ways visible. No body until this invention of this living machine has existed to protect, nurture and manufacture living knowledge from large numbers of living individuals practicing the knowledge creation process.

A living machine embodied as claimed in this invention manufactures living knowledge in somewhat the same way as an organisms' body manufactures living cells. Such manufacturing is integral to living itself. There are many ways to kill living knowledge that I will not identify or discuss here.

Living Machine for the Manufacture of Living Knowledge (Hereafter Shortened to Living Machine)

A living machine is the global body that is energized and powered by living individuals freely living, being alive, and practicing the knowledge creation process with other living individuals while providing and receiving economic value for sharing that living knowledge within its just and generous democratically self-governed Knowledge Governance Part #104 in FIG. 1.

A living machine is accountable, reflexive and self-aware through its Exchange Component Part #103 FIG. 1 and provides these same features to its living individuals that practice the knowledge creation process.

A living machine enables, ensures, protects, measures, governs and enhances the health and well-being of the living individuals that practice the knowledge creation process in the machine. The living machine and its living individuals are accountable to the same Constitution, Bill of Rights and Responsibilities and System of Justice in its Knowledge Governance Part #103 in FIG. 1.

A living machine creates trust because its survival is tied to the health and well-being of living individuals that practice the knowledge creation process in the machine. The living machine does not favor itself over the living individuals that practice the knowledge creation process in it. Only within a living machine can the full value and capability of living individuals' knowledge be realized.

A living machine technology efficiently contains, compresses and amplifies living knowledge by:

Being more trustworthy

Ensuring that a living individual's living knowledge is not appropriated

Operationalizing the additive nature of living knowledge over a living individual's life span Operationalizing an efficient way for all living individuals to accumulate assets to further their survival.

Bringing living individuals' knowledge into accessible, affordable reach of large numbers of other living individuals in a just and generous accountable and governed apparatus and machine Ensuring that the living machine is inclusive to the largest possible number of living individuals.

Preserving and harnessing new living knowledge that is created when practicing the knowledge creation process and making the new living knowledge available to and for others in the living machine.

By operationalizing and making living differences and disagreements appear in livings individuals through the practice of the knowledge creation process in a just and generous setting.

The practice of the knowledge creation process often involves experimentation integral with life experience. The living machine makes the living individual's experimentation come to life, appear, where it can be perceived, tried out and tested as well as being used by that self-same living individual and other living individuals.

Living Knowledge Economics

Sometime Shortened to Knowledge Economics

The full explication of living knowledge economics is beyond the scope of this invention application. A few key characteristics will be mentioned here.

The living machine operationalizes living knowledge economics. In living knowledge economics, the central value store is living knowledge which forms the central basis of the living machine's and the living individual's knowledge assets and currency. All living individuals create living knowledge and have an abundance of living knowledge. When the living individual contributes its living knowledge into the living machine and practices the living knowledge creation process the living individual's knowledge becomes an asset that can be exchanged through a governed, just, generous and trustworthy network and apparatus. The additive quality of living knowledge is empowered and living knowledge hoarding, hiding and obfuscation and a wide range of other practices built on risk assessments and uncertainty are mitigated.

End of Glossary

BACKGROUND

Today every Living Individual is full of Living Knowledge but most of it is lost and un-or-undervalued. No Living Machine exists that is just and generous where Living Individuals can realize the wealth and benefits of the Living Knowledge assets they have and can create.

Only a small fraction Living Individuals can provide adequately for themselves and each other. Despair, loneliness, and ill health are common and reduced individual capability is widespread. Many Living Individuals feel and are, unvalued and un-and-underappreciated with no way to improve their circumstances.

Many of the life activities that many Living Individuals value the most have no just and generous marketplace for their exchange. Some industries especially claim they cannot find enough qualified workers. At the same time technologies and ways of doing things change so rapidly that employed individuals need to be in a constant state of retraining often in difficult to learn and often in increasingly obsolete skills. Commonly whole technologies become obsolete such that an individual's skills may become largely worthless.

SUMMARY OF THE INVENTION

Technical Problem

How can large, even massive numbers of Living Individuals practice the Living Knowledge Creation Process to ensure the survival of themselves and other Living Individuals in a just and generous way? Its purpose is to be a force for good in the world.

The invention is the Living Machine to overcome the above problems.

Solution to Problem

A new type of machine technology—a Living Machine. A Living Machine embodies the practice of the Knowledge Creation Process for the Manufacture of Living Knowledge by Living Individuals. Before the invention, no machine existed to Manufacture Living Knowledge.

The invention for the Manufacture of Living Knowledge that resolves and transforms classic and long-standing dilemmas including, the free rider problem of public good economics, inflation, depreciation, obsolescence, and discounting, to name a few. The need to develop risk mitigation to these dilemmas creates great friction in markets particularly emerging technology markets.

The invented Living Machine solves these technical problems by enabling Living Individuals to freely act together and be equitably rewarded for their Living Knowledge on any subject anywhere in the world. The invented Living Machine for the Manufacture of Living Knowledge creates an asset class and source of revenue for every Living Individual not just the human individual. By doing so each Living Individual has standing and rights that can be extended through the Living Machine where the locus of agency is in Living itself.

The current invention is also an expression and embodiment of Living Knowledge Economics where wealth is stored in Living Knowledge.

The invention is likely to incentivize and inspire activity and innovation in just and generous practices because they are more supportive of health and well-being in Living Individuals.

The present invention is applicable for any practice of the Knowledge Creation Process except knowledge that destroys or ends life.

Advantageous Effects of Invention

Encourages an inclusive and very large number of Living Individuals to practice the Knowledge Creation Process to solve problems on a local or global scale while Living Individuals are valued, appreciated, and financially rewarded.

Enables large numbers of Living Individuals to have a common standing and to be included in the affairs of life.

Enables large numbers of Living Individuals to learn about themselves and others and to develop new technologies for education including self-education.

Enables large numbers of Living Individuals to practice democratic rights and responsibilities and resolve disagreements.

Enables young Living Individuals to build a nest egg of Living Knowledge, assets, and revenue for use throughout that Living Individuals' life.

While the invention may use a wide variety of mathematics in different parts of the Living Machine the Living Machine is not based on a mathematical formula or algorithm nor does it solve a mathematical problem.

The Living Machine for the Manufacture of Knowledge by Living Individuals creates many, if not an unlimited number of useful and tangible embodiments of Living Knowledge, including cyber-physical devices and instruments.

The Living Machine for the Manufacture of Knowledge by Living Individuals provides a universal and ubiquitous currency already in Living Individual's possession.

The Living Machine provides an essential machine technology to address global climate change challenges by ensuring and protecting the health and well-being for all Living Individuals. Because Living Individuals are ubiquitous on earth every nook and cranny of earth can be heard from creating large and new localized solutions to challenges.

The Living Machine will encourage and incentivize vast new neural sensing technologies. Will encourage and incentivize rapid prototyping as a form of manufacturing creating cheaper objects but based on new appreciation and understanding of the value of Living Materials.

Will encourage and incentivize highly specific customization with fewer misfits and waste in a wide array of goods.

Will vastly expand reuse.

Will encourage and make available an unprecedented number of Living Individuals that will participate is testing, treatments and modalities while cocreating goods and services.

Will create a forum for further evolution of ethical issues and foundations for life.

Will make more available Living Knowledge about resolving disputes in peaceful and innovative ways created by Living Individuals.

Because of the inventions inclusiveness a wider range of Living Individual Knowledge is retained and made available to others.

LIST AND BRIEF DESCRIPTION OF THE DRAWINGS

A living machine that provides these advantages must contain a set of interoperating parts and be constructed and assembled in the manner described below.

In the following the living machine will be described in greater detail by means of the required embodiments with reference to the accompanying drawings, in which:

FIG. 1: shows a simplified exemplary embodiment of the invention.

FIG. 2: shows a simplified exemplary embodiment of how to build the invention.

Figure 3:
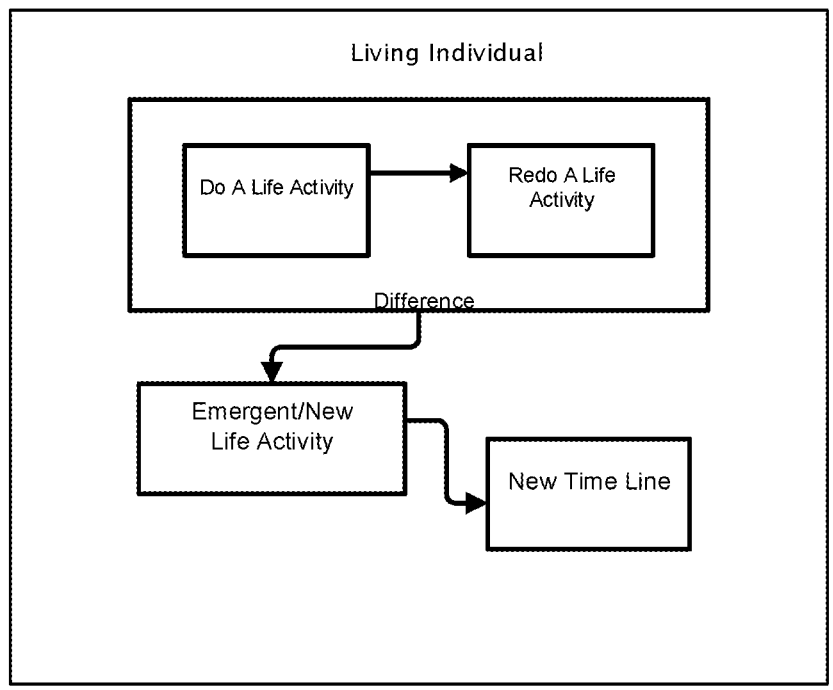

FIG. 3: shows a simplified exemplary embodiment of the invention's key manufacturing process the knowledge creation process cycle within a living individual.

DETAILED DESCRIPTION OF THE INVENTION

The present invention referred to in FIG. 1 that illustrates the Living Machine's essential parts 101-108. All parts are interoperable with distinct characteristics.

My attempt here will be to briefly for now describe only a few of the characteristics of the interoperable essential parts that have not been described elsewhere.

When the living individual freely agrees to participate in the Living Machine aspects of the living Individual's conduct are governed as will be described further below.

FIG. 1 No. 108 illustrates that all parts of a Living Machine's body are democratically self-governed and accountable to the living individuals that contribute knowledge to and practice the manufacture of living knowledge through knowledge creation process in the living machine. A Living Machine operates a unique identity and identification management technology to be disclosed at a future date.

FIG. 1 (ref. 104) Living Machine Knowledge Governance while represented as appearing 4th is analogous to the heart of the living individual. It is the first part of the living machine to be built and is most analogous to pumping living blood to all parts of the living machine. FIG. 2. The living machine's health and well-being along with the health and well-being of the living individuals in the living machines is essentially dependent of the just and generous qualities of the Living Machine's Knowledge Governance Part circulating throughout the living machine.

Each living individual has a Knowledge Home Part in the living machine. This is illustrated in FIG. 1 (ref. 102) as the Living Individual's Knowledge Home part and shortened to Home. The Living Machine's security and privacy technologies and techniques will be disclosed at a future date. The living individual is empowered to decide freely when to move the living individual's knowledge outside from the Home Part while still inside the Living Machine. The living individual's practice of the knowledge creation process remains confidential and private while at Home.

However, the living individual cannot receive revenues from their individual's living knowledge until the living individual moves their knowledge elsewhere in the living machine. When the living individual moves their living knowledge outside of the Home Part it becomes public in varying degrees controlled by the living individual within the living machine. It does not become public to the world outside the living machine. Only the living individual is empowered to decide freely actions in regard to the living individual's knowledge including how to value and price the individual's knowledge as long as the living individual is compliant with the Living Machine's Knowledge Governance.

All actions the living individual takes in regards to the living individual's knowledge interoperates and is sent to and aggregated and stored in the Living Machine's Knowledge Exchange part. FIG. 1 (ref. 103). The Exchange part is the self-aware and reflexive communication organ of the living machine which contains a record of all living machine and living individual's actions outside the living individual's Home part. All actions inside the living individual's Home are logged and a copy of the log remains at Home where the living individual can review it. The Knowledge Exchange Part uses whatever are the state of the art live (on runtime) and persistent storage and communication technologies including parallel massive many multi-tiered databases. Any living knowledge that leaves a living individual's Home Part passes through Exchange Part where it is logged and a log copy is returned to the Individual's Home. After the living knowledge leaves a living individual's Home and passes through Exchange it is sent to be evaluated by the Living Machine's Knowledge Governance Part as shown in FIG. 1 (ref. 104). The Knowledge Governance part is a reflexive self-aware series of structured and unstructured databases and metabases through which the living knowledge is logged, audited and reviewed for conformance to the Governance Constitution, Bill of Rights and Responsibilities and System of Justice. Any anomalies are logged and the Living Machine's System of Justice's Dispute Resolution System is invoked with a wide range of remedies. In the Living Machine's Dispute Resolution System, the ability to pay legal fees is equalized such that a living individual with greater financial resources cannot unjustly prevail over living individuals with fewer financial resources. Further the living individual is empowered to participate in the crafting and evolution of the Living Machine's Constitution, Bill of Rights and Responsibilities and System of Justice which can and may change from over time. However, while the Founding Principles Constitution, Bill of Rights and Responsibilities and System of Justice may be added to the Founding Principles as identified just below cannot be removed in part or in whole:

the knowledge of life is the essential labor of every life.
every life has an inalienable right to and responsibility for its knowledge.
every life has a right to revenues generated through or from the shared use of its knowledge.
all life encodes in its unique signature an intrinsically creative insight into living.
the world is bountiful with human creativity.
the greatest value of creativity is reached when it is shared in a respectful and just manner.
democracies and institutions within democracies are living entities that can and must grow, change and refine themselves in order to create more just, compassionate and free societies.
no life should end without its legacy being valued
and that each life develops knowledge that is irreplaceable and needed by living individuals.
every life has its knowledge and that taken together all this life knowledge is a most powerful force for good in the world.
every participant in the invention must tell the truth.
the invention is a participant.
no participant should steal or help another participant, person or entity to steal other participants' knowledge.
the protection of children's knowledge and general well-being up until the age of majority is among the highest responsibilities of every participant.
the appreciation of creativity and creative acts in oneself and others stimulates more creativity in oneself and in others.
the safety and security of participants' and the invention's knowledge is a shared responsibility.
That the invention is responsible for making good faith efforts to ensure the safety of the invention's systems and
the participant is responsible for making good faith efforts to secure the access of the participant to the invention.

If no actions emerge from the invocation of the living machine's Dispute Resolution System the living individual's knowledge may be sent to Marketplace Part FIG. 1 (ref. 105) and/or Knowledge Development, Distribution and Broadcasting Part FIG. 1 (ref. 106) where it can be offered for sale along with a large range of other actions possible and to be disclosed at a future date. Any other living individual in the living machine can add to the living knowledge of another living individual in the living machine.

To build the Living Machine first the Knowledge Governance part must be built. Without a strong and just Governance subsystem, stealing, hiding, hoarding and obfuscating can flourish unchecked and limit the invention's capacity to generate knowledge and wealth for the greatest number of living individuals.

After creating the Knowledge Governance Part the invention needs to create the Knowledge Exchange Part FIG. 1 (ref. 103) where living knowledge about the invention and a living individual's interaction with the invention are recorded and returned to that same living individual. In this way a living individual retains an interest in and access to how the system is recording and sharing a living individual's knowledge. Then the Living Machine's Marketplace FIG. 1 (ref. 105) and Development, Distribution and Broadcasting Part FIG. 1 (ref. 106) are built.

This step provides a media-rich way to distribute, develop and broadcast a living individual's knowledge through the Distribution, Development and Broadcasting See FIG. 1 (ref. 106). The number and richness of the ways in which a living individual's knowledge is distributed allows greater amplification of the wealth generating capacity of the knowledge.

Next the secure and private Home FIG. 1 (ref. 102) is built.

The last step is to review what the invention knows including about itself, in order to improve and innovate in the invention itself and in ways that are not expected through the New Knowledge System Part. This New Knowledge System Part is an opening or clearing left in the invention so the emergent/new is anticipated and welcomed when it arrives. See FIG. 1 (ref. 107).

In general, when one living individual attempts to take, or force the extraction of another living individual's knowledge, that first living individual is likely to feel violated, injured and reluctant or even outright refusing to participate in the extraction. Since the invention itself must abide by the Knowledge Governance Part the invention is prohibited from extracting a living individual's knowledge. The invention provides a secure and just operating environment where a living individual can control the deposition, sharing, development, marketing, broadcasting and governance of the living individual's knowledge.

The invention embodies the most practical, fun, fast, efficient and just way to gather knowledge from the knowledge creation process and create the most wealth for its living individuals.

Living Machines are dedicated to enabling and protecting the life and living of all living individuals in the living machine for knowledge creation. The living machine's power and success is measured by the range and amount of living knowledge the living individuals can manufacture as long as they don't damage or end life. The health and well-being of each living individual is of equal value.

What is claimed is:

1. An electronic cyber secure, distributed network based system or Living Machine for knowledge creation and distribution, said electronic-network based system comprising:
  at least one computer processor account subsystem, said at least one computer processor account subsystem having a plurality of user accounts;
  at least one computer processor exchange subsystem;
  at least one computer processor governance subsystem for governing activities of said at least one computer processor exchange subsystem; said at least one computer processor governance subsystem being a system of self-governance through said plurality of said user accounts;
  wherein said exchange subsystem is internetworked with said computer account system and said computer governance subsystem and a computer marketplace subsystem; and wherein said computer exchange subsystem is configured by said computer governance system to operate in accordance with said self-governing system to:
  receive through each of said plurality of user accounts, an election of at least one person responsible for said computer exchange subsystem; this at least one person responsible for the computer exchange subsystem and administering the governance subsystem; this governance subsystem includes how and when to at least;
  assign rights, activate a dispute resolution governance process, bequeath knowledge, close aspects, and participate in governance framework:
  receive a first user's knowledge deposited through a first user account of said plurality of user accounts of said computer account subsystem; receive a second user's offer for purchasing a view of said knowledge deposit, said offer being sent through a second user account of said plurality of user accounts of said computer account subsystem; accept said second user's offer; and distribute the knowledge deposit view to said second user account of said computer account subsystem in exchange for receiving, from said second user's account, money revenue for the purchase:
  the governance structure dispute resolution process further comprising, internetworking with said computer exchange subsystem; and
    wherein said exchange subsystem is further configured to: log particulars of said second user's offer to purchase said view, said acceptance of said second user's offer; and said distribution of said purchased view to said second user account; log a receipt of said particulars in at least one of said first user account and said second user account; and wherein said dispute resolution governance process is configured to:
    resolve a dispute between user accounts based on said logged particulars and logged receipt in response to receiving input from at least one of said first user account and said second user account whereby the ability to pay legal fees is equalized;
  the computer marketplace subsystem operably connected to the computer exchange subsystem and capable of receiving account user requests for knowledge searching by other account users wherein said exchange subsystem is further configured to;
  post said first user's knowledge on said computer marketplace subsystem for viewing by account users in response to a request for posting said first user's knowledge; said request being submitted through said first user account of said computer account subsystem; record at least one account user interest in said first account user knowledge posting in response to receiving an interest input from said at least one account user; determine from said record of at least one account user interest the number of account users interested in said first user knowledge posting; and send in a message said amount of interested account users for viewing by said first user account.

* * * * *